United States Patent Office 3,179,618
Patented Apr. 20, 1965

3,179,618
SHAPED CONDENSATION POLYMERS
William John Roberts, Mountain Lakes, N.J., assignor to Celanese Corporation of America, New York, N.Y., a corporation of Delaware
No Drawing. Filed May 3, 1961, Ser. No. 107,295
14 Claims. (Cl. 260—34.2)

This invention relates to an improved process for the formation of shaped articles such as filaments of condensation polymers.

There exists a wide variety of synthetic condensation polymers which are suitable for the manufacture of shaped articles, e.g., filaments and fibers for the manufacture of textiles and films. Many of these polymers have nitrogen and/or oxygen atoms as an integral part of the polymer chain. Polymers containing nitrogen in the polymer chain include the polyamides proper, e.g., the nylons wherein repeating —NRCO— groups are attached to carbons on either side, the polyurethanes which contain repeating —NRCOO— groups, the polyureas which contain repeating —NRCONR— groups and the polysulfonamides which contain repeating —NRSO$_2$— groups, where R is hydrogen or a monovalent organic radical, e.g., lower alkyl. A group of well known polymers containing oxygen in the polymer chain is the polyesters which contain repeating —CO—O— groups. The usual method of forming these polymers into shaped articles such as filaments and films is to extrude the melted polymer through suitably shaped openings, e.g., the orifices of a spinnerette in the case of the melt spinning of filaments or a slot in the case of film formation.

While melt extrusion techniques are often suitable for many of the aforementioned polymers it may be desired in some instances to obtain shaped polymer articles without melting the polymer. For example, it may be desired to avoid the degradation that often takes place when some polymers are heated to a degree sufficient to melt them. In other cases it may be desired in producing shaped articles of polymers to use the facilities of an existing plant which are more designed for wet or dry spinning than for melt spinning.

In addition to the above, there exist polymers within the class set out to which melt extrusion techniques cannot easily be applied at all. The polymers may be characterized as "difficultly meltable" polymers. For example, in the case of high melting polymers, e.g., polyamides melting above 275° C. and polyurethanes melting above 179° C., more usually above 210° C. the polymer often begins to degrade seriously at a temperature very close to the melting point and/or the polymer further polymerizes to a useless infusible mass. However, because of the desirable properties of many of these polymers, e.g., a combination of good mechanical properties such as tenacity and elongation, dye receptivity, water insensitivity and glaze resistance not often found in the more common polymers which can be melt spun, any method which can be used to form them into useful shaped articles such as filaments and films is much to be desired.

It is an object of this invention to provide an improved method of forming shaped articles of condensation polymers containing nitrogen and/or oxygen in the polymer chain. It is a further object of this invention to provide a method of forming shaped articles, e.g., filaments or films, from difficultly meltable polymers of this class.

In accordance with one aspect of the invention, a condensation polymer containing nitrogen and/or oxygen in the polymer chain is dissolved with a boron trihalide, e.g., boron trifluoride, in a solvent to form a solution which may be extruded through a suitably shaped opening, e.g., the orifices of a spinnerette to form filaments or a slot-shaped opening to form films. It has been found that in the presence of a boron trihalide, polymers within the defined class may be dissolved in many solvents in which they are ordinarily insoluble. While it is not desired for the invention to be limited by any theory, it is believed that a chemical complex of the polymer and boron trihalide and possibly, also the solvent is formed which results in the formation of a homogeneous solution.

One suitable method of preparing the polymer solutions of this invention is to first prepare a slurry of the finely-divided, solid polymer in the solvent. If boron trifluoride is used, the gaseous compound is bubbled through the slurry until the polymer particles are no longer visible. The solution may then be extruded through a suitably shaped opening, e.g., the orifices of a spinnerette or a slot-shaped opening, into a mass of coagulating liquid, i.e., a spin bath, wherein the boron trihalide is taken up by the coagulating liquid and a regenerated solid polymer having the desired shape is obtained. It is also possible to dry spin the polymer and subsequently treat the resulting shaped article to recover the boron trihalide.

In addition to boron trifluoride, boron trichloride and boron tribromide may also be used.

The process of this invention may be applied, for example, to fiber forming linear polyamides having repeating structural units of the formula

—NR—Y—NR'—CO—Y'—CO— which result from the condensation of dicarboxylic acid or a derivative, e.g., a salt, acyl halide or ester of such an acid, and a diamine, polyamides which have repeating structural units of the formula —NR—Y—CO— which result from the autocondensation of aminocarboxylic acids, fiber-forming polyurethanes having repeating structural units of the formula

—NR—Y—NR—CO—O—Y'—COO— resulting, for example from the condensation of a diisocyanate and a dihydric alcohol or from a diamine and a bis(chloroformate) of a dihydric alcohol, polyureas having repeating structural units of the formula

—CO—NR—Y—NR—CO—NR'—Y'—NR'— resulting, for example, from the condensation of a diamine and a diisocyanate, a diamine and a diurethane or a diamine and phosgene, fiber-forming polyesters having repeating structural units of the formula

—CO—Y—CO—O—Y'—O— resulting from the condensation of a dihydric phenol or alcohol and a dicarboxylic acid or derivative, e.g., an ester, salt or acyl halide thereof, fiber-forming polyesters having repeating structural units of the formula

—CO—Y— resulting from the autocondensation of a hydroxycarboxylic acid, and polysulfonamides having repeating structural units of the formula

—SO$_2$—Y—SO$_2$—NR—Y'—NR— resulting, for example, from the condensation of disulfonic acid halides and diamines, wherein the R's are hydrogen or monovalent organic radicals, e.g., lower alkyl such as methyl or ethyl, and the Y's are divalent organic radicals such as alkylene containing 1 to 10 carbon atoms e.g., ethylene, tetramethylene or hexamethylene, arylene such as para- and meta-phenylene, para-xylylene and para-diethylene benzene, cycloalkylene such as 1,4-cyclohexylene, and in the case of polyamides, polyurethanes and polyureas, divalent heterocyclic radicals such as those derived from piperazine and alkyl substituted piperazines wherein the open bonds are attached to nitrogen atoms.

An important group of polymers within the above class consists of polyamides, polyurethane and polyureas, wherein the monomers are such that and/or the polymerization technique used is such that a polyamide melting above 275° C. or a polyurethane or polyurea melting above 179° C. preferably above 210° C. is obtained. These include, for example, many polymers having repeating structural units of the above formulas, in which at least one repeating group is or contains a para- or meta-phenylene or 1,4-cyclohexylene radical. It has been found that whereas these relatively high melting polymers cannot easily be shaped using melt extrusion techniques because of their tendency when heated to degrade or decompose or to further polymerize to a useless, infusible mass, they can be shaped by dissolving them in the presence of a boron trihalide and extruding into a coagulating liquid by means of wet spinning techniques or into an evaporative medium for the solvent using dry spinning techniques. Moreover the process of this invention may be used to spin many condensation polymers containing nitrogen, oxygen and/or sulfur in the polymer chain using spinning solvents in which the polymers are not ordinarily soluble.

An important group of polyamides which may be treated in accordance with this invention are condensation products of a diamine and terephthalic acid or an ester-forming derivative of terephthalic acid, e.g., terephthaloyl chloride or a dialkyl terephthalate. Some specific polymers within this latter group are poly (polymethylene) terephthalamides wherein the polymethylene groups contain 1 to 10 carbon atoms, e.g., polyhexamethylene terephthalamide, polytetramethylene terephthalamide, polyethylene terephthalamide and polypiperazylene terephthalamide, and other polyterephthamides such as poly-o-, m-, and p-xylylene terephthalamides and poly-o-, m-, and p-diethylene phenylene terephthalamides, the latter prepared, for example, by condensing an ester-forming derivative of terephthalic acid with para-bis(beta-aminoethyl) benzene.

Some specific high melting autocondensation products of an aminocarboxylic acid or a lactam or other derivative of such an acid are polymers of p-aminobenzoic acid or its lactam, polymers of 1-carboxymethyl-4-aminocyclohexane or its lactam, and polymers of 1-carboxy-3-aminocyclopentane or its lactam.

Some specific polyurethanes are for example, the condensation product of tetramethylene diamine with bis-(chloroformate) of butanediol-1,4, which has a melting point of 220° C., the condensation production of piperazine with the bis(chloroformate) of bis(p-hydroxyphenyl) propane-2,2 having a melting point of 230–245° C., the condensation products of piperazine with bis-1,4-cyclohexylene glycol having a melting point of 275° C. and of piperazine with trans-1,4-cyclohexylene glycol having a melting point of above 390° C., and the condensation product of 1-aminomethyl-4-hydroxymethyl benzene and phosgene.

Specific polyureas are for example, the condensation product of hexamethylene diisocyanate with hexamethylene diamine which has a melting point of 295–300° C., the condensation products of m-phenylene diisocyanate with m-phenylene diamine, of p-xylylene diamine with phosgene, and of p-diaminoethyl benzene with phosgene.

Specific polysulfonamides are those formed, for example, by the condensation of p-xylylene di(sulfonyl chloride) with p-xylylene diamine and of p-phenylene di(sulfonyl chloride) with p-diaminobenzene.

Some specific polyesters are, for example, polyethylene terephthalate, and condensation products of 1,4-dihydroxymethyl cyclohexane with terephthalic acid or one of its ester-forming derivatives and of 2,2-di(p-hydroxyphenyl) propane with terephthalic acid or one of its ester-forming derivatives.

A wide variety of solvents may be used in forming spinning solutions of the polymer-boron trihalide complexes. Many of these are liquids of relatively high polarity, e.g., water, formic acid, lower alkane carboxylic acids such as acetic acid, lower alkanols such as methanol, ethanol and isopropanol, lower alkyl ketones such as acetone, polyhydric alcohols such as ethylene glycol and glycerol, lower nitroparaffins such as nitromethane and nitroethane and water-soluble esters such as ethyl lactate. A particularly suitable class of solvents are the nitriles of carboxylic acids, e.g., containing up to 8 carbon atoms, as, for example, lower fatty acid nitriles such as acetonitrile, propionitrile and butyronitrile, dinitriles of dicarboxylic acids such as glutaronitrile and adiponitrile, and nitriles of aromatic dicarboxylic acids such as benzonitrile. Many of the preferred organic liquids found to be useful as solvents are liquid at room temperature and water-miscible in all proportions.

Solvents which are particularly useful in forming solutions of difficultly meltable polycarbonamides, e.g., those melting above 275° C. such as the class of polyterephthalamides set out above, e.g., polyhexamethylene terephthalamide, are nitriles of lower fatty acid such as acetonitrile, formic acid, lower alkane carboxylic acids such as acetic acid, lower alkanols such as methanol, ethanol and isopropanol, lower alkyl ketones such as acetone, water-soluble esters such as ethyl lactate and nitromethane; solvents which are particularly suitable for difficultly meltable polyurethanes and polyureas, e.g., those melting above 175° C. and preferably above 210° C. such as the condensation product of tetramethylene diamine with the bis(chloroformate) of butanediol-1,4, are water, formic acid and lower alkanols such as methanol and ethanol; and solvents which are particularly useful for dissolving complexes of boron trifluoride and polyesters, e.g., polyethylene terephthalate are water, formic acid and lower alkyl ketones such as acetone. In each of these cases, the polymer is insoluble in the named solvent in the absence of the boron trihalide.

The solutions formed in accordance with the process of this invention may contain, for example, 5 to 50, preferably 10 to 25% by weight of polymer (reckoned as uncomplexed polymer) based on the weight of the solution. The amount of boron trihalide present may be 0.5 to 10, preferably 1 to 2 moles per mole of polymer recurring unit. In some cases, the boron trihalide may form a complex with the solvent as well as with the polymer. In this case a greater amount of boron trihalide is required than if no solvent-boron trihalide complex is formed.

In forming a slurry of polymer in solvent prior to the introduction of boron trihalide, the finely divided polymer may have a mesh size of, for example, 8 to 200. While most conveniently prepared at room temperature, the polymer solutions of this invention may be prepared within a wide range of temperatures, e.g., 0 to 100° C., preferably 20 to 80° C.

The solutions of this invention may be used to form shaped articles of polymer, e.g., filaments, by extruding the solution into an evaporative medium for the solvent, e.g., air, or into any of a wide variety of coagulating liquids for the polymer. If, extrusion into a coagulating liquid is utilized, the shaped article obtained, is, in general, of regenerated, i.e., uncomplexed polymer and the liberated boron trihalide is dissolved in the coagulating liquid which may be treated for its recovery. The coagulating liquid may, in some cases, even be a compound or mixture of compounds which themselves are capable of acting as solvents for the polymer in the presence of the boron trihalide. They may be used as coagulating liquids, however, because the concentration of boron trihalide in the coagulating bath is not sufficient to keep the polymer dissolved. The coagulating liquid may, for example, be water, isopropanol, tertiary butanol, n-butanol, tetrahydrofuran, water-acetic acid mixtures, water-formic acid mixtures, tetrahydrofuran-formic acid mixtures, tetrahydrofuran-acetic acid mixtures and methanol-water mixtures.

The properties of the filaments made in accordance with the process of this invention may be improved by stretching or drawing the filaments at a temperature, for example, of 20° C. to 20° C. below the melting point of the polymer. The stretching may be, for example, up to 500% increase in length and may take place in a gaseous medium such as air or in an inert liquid medium. In some instances, it is advantageous to stretch the filament while it is pressed over a hot surface.

The following examples further illustrate the invention.

Example I

Polyhexamethylene terephthalamide having an inherent viscosity measured in sulfuric acid of 0.71 dl./g. and prepared using the interfacial technique and magnesium oxide as an acid binder, as described in application Serial No. 6,885, filed February 5, 1960, by Jamison, was ground to pass a 40 mesh sieve and slurried in formic acid. The polymer was present in an amount of 20% by weight of the slurry. While the slurry was under agitation, boron trifluoride gas was metered in until the polymer dissolved at which time the mass had taken up 0.9 mole of boron trifluoride per mole of —NHCO— units in the polymer. Heat was evolved during the absorption and ice-bath chilling was used as required to maintain the temperature at about 30° C.

The solution which had a viscosity of 100 poises at 25° C. was extruded through an orifice having a diameter of 0.200 mm. into water as a coagulating liquid and the resulting filament was taken up at a take-up speed of 10 meters per minute. The filament was useful for various applications, e.g., the manufacture of textiles.

Useful filaments were also obtained when the solution of this example was extruded as described above in the following coagulating liquids: a mixture of 7 parts per weight of water and 1 part formic acid at a take-up speed of 13 meters per minute; a mixture of 25 parts of water and 1 part formic acid at a take-up speed of 12 meters per minute; a mixture of 2 parts water and 1 part formic acid at a take-up speed of 10 meters per minute; and into isopropanol, tertiary butanol, a mixture of 1 part tetrahydrofuran and 2 parts formic acid, and a mixture of 1 part tetrahydrofuran and 8 parts formic acid without winding up.

Example II

The solution preparation procedure of Example I was followed except that a solution of 20% by weight of polymer in acetic acid rather than formic acid was formed. The solution took up 8.3 moles of boron trifluoride per mole of —CONH— in the polymer and was a clear dope, with a viscosity of about 1000 poises at 25° C.

Useful filaments were obtained by extruding the solution of this example into the following coagulating liquids using the procedure of Example I: water at a take-up speed of 11 meters per minute; a mixture of 9 parts water and 1 part acetic acid at a take-up speed of 10 meters per minute; a mixture of 3 parts water and 1 part acetic acid at a take-up speed of 7 meters per minute and in methanol; a mixture of 7.5 parts methanol and 1 part water, and a mixture of 2.5 parts methanol and 1 part water without substantial take-up speeds.

Example III

The polymer of Examples I and II was dissolved in a boron trifluoride-diacetic acid complex, a stable liquid formed from 2 moles of acetic acid per mole of boron trifluoride, to yield a solution containing 20% by weight of polymer on an uncomplexed basis.

Useful filaments were obtained by extruding the solution of this example into the following coagulating liquids: tetrahydrofuran; acetic acid; benzene, cyclohexane; n-butanol; tertiary butanol; a mixture of 1 part acetic acid and 1 part water and a mixture of 1 part tetrahydrofuran and 1 part acetic acid.

Example IV

The solution preparation procedure of Example III was followed except that the solvent was a boron trifluoride dihydrate complex, a stable liquid formed from 2 moles of water per mole of boron trifluoride.

A useful filament was prepared by extruding the solution of this example into water.

Example V

A polyurethane resulting from the condensation of tetramethylene diamine and bis(chloroformate) of butanediol-1,4 using the interfacial technique was separately dissolved in formic acid, ethanol, methanol and water by means of boron trifluoride using the procedure of Example I. The solutions could be formed into useful shaped articles.

Example VI

Polyethylene terephthalate having an inherent viscosity of 0.6 dl./g. measured in a mixture of 10 parts phenol and 7 parts symtrichlorphenol was separately dissolved in acetone, formic acid and water by means of boron trifluoride as described in Example I. The resulting solutions could be formed into useful shaped articles.

Example VII

Polyhexamethylene terephthalamide having an inherent viscosity of 1.21 was slurried in acetonitrile containing a small amount of water at room temperature. Boron trifluoride gas was then metered into the slurry while it was being agitated until a clear solution formed having a viscosity at 25° C. of 550 poises and containing, based on the weight of the solution, 17.2% of polymer, 18.0% of boron trifluoride, 1.2% of water and 63.6% of acetonitrile. Heat was evolved during the absorption of boron trifluoride and the temperature of the solution was maintained at 25° C. by means of a water bath.

A useful filament was dry spun by extruding the solution of this example at 85° C. through an orifice 50 microns in diameter vertically downward into a spinning cabinet 1 meter long containing air at 57° C. circulating cocurrent with the filament. The filament was taken up at the exit end of the spinning cabinet at a speed of about 50 meters per minute and was water washed under slight tension. The properties of this filament were improved by stretching it 100% while it was pressed over a hot metal surface at 270 to 290° C.

Useful filaments were also wet spun by extruding the solution in a horizontal direction through an orifice 100 microns in diameter into coagulants at 30° C. containing 25 to 50% by volume of acetonitrile and the remainder either water or methanol, and also into a coagulant at 80° C. containing 70% by volume of glycerine and 30% by volume of water. Each of the wet spun filaments was taken up at 25 meters per minute after traveling through about one meter of the coagulant.

The inherent viscosities referred to above represent the function $$\frac{\ln \eta_r}{c}$$

at 25° C. and 0.1% polymer concentration of a solution of polymer in the indicated solvent where $\eta_r$ is the relative viscosity of the solution at 25° C., i.e., the ratio of the viscosity of the solution to the viscosity of the solvent, and $c$ is the polymer concentration expressed as percentage ratio of polymer weight in grams to solvent volume in cubic centimeters. The inherent viscosity is thus expressed as deciliters per gram.

It is to be understood that the foregoing detailed description is given merely by way of illustration and that many variations may be made therein without departing from the spirit of my invention. This is a continuation-in-part of application Serial No. 38,708, filed June 27, 1960.

Having described my invention what I desire to secure by Letters Patent is:

1. A process comprising agitating a condensation polymer having at least one member of the group consisting of nitrogen and oxygen as an integral part of the polymer chain, in a solvent to form a slurry and introducing boron trifluoride gas into said slurry until said polymer dissolves.

2. The process of claim 1 wherein said solution is extruded through an opening of a predetermined shape into a coagulating liquid to form a shaped article.

3. The process of claim 4 wherein said shaped article is a filament.

4. The process of claim 1 wherein said solution is extruded through an opening of predetermined shape into an evaporative medium for the solvent to form a shaped article.

5. The process of claim 4 wherein said shaped article is a filament.

6. The process of claim 5 wherein said filament is stretched at a temperature of 20° C. to 20° C. below the melting point of said polymer.

7. The process of claim 1 wherein said polymer is a polycarbonamide having a melting point above 275° C.

8. The process of claim 7 where said polycarbonamide is a linear polyterephthalamide.

9. The process of claim 8 where said polyterephthalamide is a poly (polymethylene) terephthalamide wherein said polymethylene groups contain 1 to 10 carbon atoms.

10. The process of claim 9 wherein said poly (polymethylene) terephthalamide is polyhexamethylene terephthalamide.

11. A process comprising dissolving a condensation polymer having at least one member of the group consisting of nitrogen and oxygen as an integral part of the polymer chain, in a solvent in the presence of boron trifluoride, to form a solution, and extruding said solution through an opening of a predetermined shape into a coagulating liquid to form a shaped article.

12. The process of claim 11 wherein said shaped article is a filament.

13. A process comprising dissolving a condensation polymer having at least one member of the group consisting of nitrogen and oxygen as an integral part of the polymer chain, in a solvent in the presence of boron trifluoride, to form a solution, and extruding said solution through an opening of predetermined shape into an evaporative medium for the solvent to form a shaped article.

14. The process of claim 13 wherein said shaped article is a filament.

References Cited by the Examiner
UNITED STATES PATENTS

| | | | |
|---|---|---|---|
| 2,806,830 | 9/57 | De Witt | 260—29.2 |
| 2,831,834 | 4/58 | Magat | 260—78 |
| 2,989,495 | 6/61 | Hare et al. | 260—29.2 |

OTHER REFERENCES

Srinivasan et al.: J.A.C.S., 78 (1956), pp. 5262–66.

MORRIS LIEBMAN, *Primary Examiner.*

LEON J. BERCOVITZ, *Examiner.*